United States Patent
Farber

[11] 3,821,306
[45] June 28, 1974

[54] POLYETHERS HAVING OXIDIZED THIOETHER SIDE CHAINS

[75] Inventor: Hugh A. Farber, Midland, Mich.

[73] Assignee: The Dow Chemical Company, Midland, Mich.

[22] Filed: Aug. 1, 1969

[21] Appl. No.: 846,949

[52] U.S. Cl............... 260/584 R, 210/54, 260/2 A, 260/79.3 R, 260/239 A, 260/239 B, 260/239 E, 260/243 R, 260/247.1, 260/251 R, 260/268 PL, 260/268 BI, 260/293.63, 260/293.64, 260/293.65, 260/293.73, 260/293.85, 260/302 R, 260/307 R, 260/309.7, 260/326.84, 260/327 R, 260/333, 260/563 C, 260/563 P, 260/563 R, 260/567.6 M, 260/570.6, 260/570.8 R, 260/570.9, 260/571, 260/573, 260/574, 260/575

[51] Int. Cl............................................ C07c 87/20

[58] Field of Search . 260/564 E; 260/584 B, 79.3 R

[56] References Cited
UNITED STATES PATENTS

| | | | |
|---|---|---|---|
| 2,619,508 | 11/1952 | Mikeska et al. | 260/609 |
| 3,151,164 | 9/1964 | Sammons | 260/584 X |
| 3,415,902 | 12/1968 | Hickner et al. | 260/609 X |

Primary Examiner—Lewis Gotts
Assistant Examiner—C. F. Warren
Attorney, Agent, or Firm—Michael S. Jenkins

[57] ABSTRACT

Polyethers having utility as adhesion promoters for various polymers to metals and other substrates comprise repeating monomer units represented by the general formula:

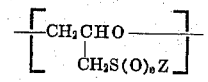

wherein Z is $-CH=CR_1R_2$, or

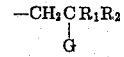

wherein G is hydroxyl, halogen or amine, $R_1$ and $R_2$ are individually hydrogen or a monovalent organic radical and e is 1 or 2. Exemplary of Z are $-CH=CH_2$,

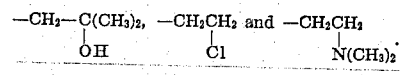

6 Claims, No Drawings

POLYETHERS HAVING OXIDIZED THIOETHER SIDE CHAINS

BACKGROUND OF THE INVENTION

This invention relates to novel polyethers having oxidized thioether side chains and their utility as adhesion promoters for various polymers.

It is well known to prepare polyethers by polymerizing an alkylene oxide (so-called epoxide) alone or with other alkylene oxides, usually in the presence of an active hydrogen activator such as an alcohol or a polyol. Such polymerizations are generally facilitated by using a Friedel-Crafts catalyst such as boron trifluoride and the like to yield polymers represented by the general formula:

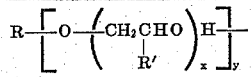

wherein R is hydrogen or the residue of an organic active hydrogen initiator, R' is hydrogen or alkyl and x and y are individually positive whole numbers.

It is also known to polymerize epihalohydrin alone or with other epihalohydrins or alkylene oxides, preferably in the presence of an active hydrogen initiator and/or a Friedel-Crafts catalyst, to yield polyethers in which at least a portion of the side chains are haloalkyl.

As taught in U.S. Pat. Nos. 2,619,508 and 3,415,902, the halogen atoms of the side chains can be replaced with alkylthio radicals or hydroxyalkylthio radicals by reacting the polyether having haloalkyl side chains with alkali metal mercaptides or mercaptoalkanol dissolved in alkali.

Polyethers having oxidized thioether side chains having the formula: $-CH_2S(O)_eZ$ wherein Z is $-CH=CR_1R_2$ or

G is hydroxyl, halogen or amine and e is 1 or 2 have not been previously known.

SUMMARY OF THE INVENTION

In accordance with the present invention polyethers having pendant oxidized thioether side chains, described hereinafter in more detail, are provided. These polyethers possess surprising properties making them useful as adhesion promoters for various organic polymers.

Characteristically, these novel polyethers comprise at least 10 mole percent of repeating monomer units represented by the general formula:

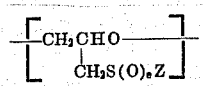

wherein e is 1 or 2 and Z is a monovalent organic radical represented by one of the following formulas:

$$-CH=CR_1R_2 \text{ and}$$

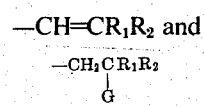

in which G is hydroxyl, halogen or amine, $R_1$ and $R_2$ are individually hydrogen or a monovalent organic radical.

In addition to their utility as adhesion promoters for organic polymers, the polyethers having β-hydroxysulfoxide and/or β-hydroxysulfone side chains can be reacted with aminoplast resins to produce thermoset resins or with polyisocyanates to produce polyurethane resins. The polyethers of the present invention are also useful as treating agents for natural fiber containing fabrics to render the fabrics wrinkle resistant and dimensionally stable.

DESCRIPTION OF THE PREFERRED EMBODIMENTS

The polyethers of the present invention have as an essential component a repeating monomer unit represented by the general formula:

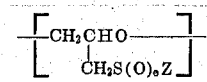

wherein Z and e are as generally defined hereinbefore. For the essential component to impart the desired functionality to the polyether, said component must comprise at least 10 mole percent of the polyether.

Specifically Z is a radical selected from radicals having the formulas:

$$-CH=CR_1R_2 \text{ and}$$

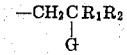

wherein $R_1$, $R_2$ and G are as generally defined hereinbefore. Illustratively, $R_1$ and $R_2$ are individually hydrogen or monovalent organic radicals such as alkyl and substituted alkyl, aryl and substituted aryl, aralkyl and substituted aralkyl, cycloalkyl and substituted cycloalkyl, aryloxy, alkoxy, poly(alkyleneoxy)alkyl, poly(alkylenethio)alkyl and the like. Preferably $R_1$ and $R_2$ are individually hydrogen, alkyl having from 1 to to 12 carbon atoms, aryl having from 6 to 12 carbon atoms, hydroxyalkyl having from 2 to 12 carbon atoms, aryloxyalkyl with aryl having from 6 to 12 carbon atoms, alkoxy having from 1 to 12 carbon atoms and the like.

Halogen includes halogen radicals such as chloro, bromo or iodo, with chloro or bromo being preferred.

Illustratively, amine is an amine radical represented by the formula $-NR_3R_4$ wherein $R_3$ and $R_4$ are individually hydrogen or a monovalent organic radical such as alkyl, aryl, aralkyl, alkenyl, hydroxyalkyl, alkoxyalkyl, alkoxyaryl, aryloxyalkyl, aryloxyaryl, cycloalkyl, poly(alkyleneimino)alkylamine, and the like. $R_3$ and $R_4$ are collectively a divalent organic radical such as alkylene, alkyleneoxyalkylene, alkylenethioalkylene, alkyleneiminoalkylene and the like. Preferably $R_3$ and $R_4$ are individually hydrogen or an alkyl radical having from 1 to 12 carbon atoms. It is understood that the amine radical may be in ammonium form, i.e.,

wherein $R_6$ is hydrogen or a monovalent organic radical such as $R_3$ and $R_4$.

These polyethers have molecular weights ranging from a few hundred up to about 3 million, with preferred polyethers ranging from 300 up to 2 million. Particularly effective adhesion promoters are the polyethers having molecular weights ranging from about 300 to about 10,000.

In preferred embodiments the polyethers are more specifically represented by the general statistical formula:

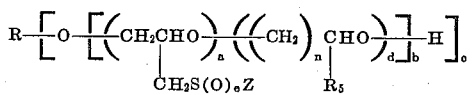

wherein R is hydrogen or the residue of an organic active hydrogen activator; $R_5$ is hydrogen or a monovalent organic radical with the valence existing on a carbon atom; a is a positive integer and d is O or a positive integer provided that the radio of a to d is such that the polyether contains at least 10 mole percent of

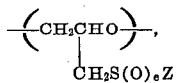

preferably the ratio is from about 1:8 to about 1:0; b is a positive integer, preferably from 1 to 10,000; c is a positive integer, preferably from 1 to 8 and n is a positive integer from 1 to 4.

Exemplary of $R_5$ are hydrogen and monovalent radicals such as alkyl and substituted alkyl, aryl and substituted aryl, and the like. Preferably the alkyl radical has from 1 to 4 carbon atoms and aryl has 6 to 12 carbon atoms. Substituted alkyls include haloalkyl; mercaptoalkyl; alkoxyalkyl wherein alkoxy has from 1 to 20 carbon atoms, particularly alkoxymethyl; aryloxyalkyl wherein aryloxy has from 6 to 20 carbon atoms, particularly aryloxymethyl; alkylthioalkyl wherein alkylthio has 1 to 20 carbon atoms; arylthioalkyl wherein arylthio has from 6 to 20 carbon atoms and the like. Substituted aryls include haloaryl, mercaptoaryl, alkoxyaryl, aryloxyaryl, and the like.

It is further understood that $R_5$ may be different radicals within a single polyether molecule. For example, the polyether may have the statistical formula:

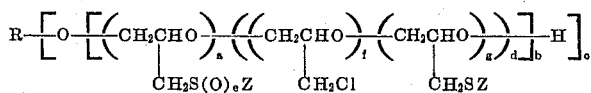

wherein f and g are positive integers.

It is further understood that the repeating unit,

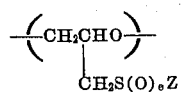

of a single polyether molecule may be entirely in the form,

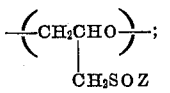

or entirely in the form,

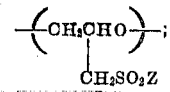

or in the form of a mixture of

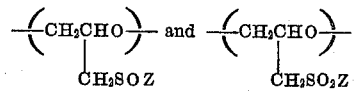

in any proportions. Illustratively

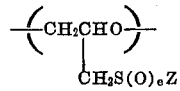

is represented by the formula

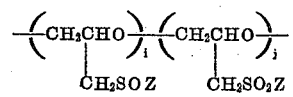

wherein i and j are individually O or positive numbers and the ratio of i to j ranges from 1:0 to 0:1 provided that when i is O, j is 1 and when j is O, i is 1.

In general the polyethers of the present invention can be prepared by first polymerizing an epihalohydrin or copolymerizing the epihalohydrin with one or more alkylene oxides; subsequently substituting at least a portion of halogen atoms on the polyether side chains with an appropriate mercaptide, e.g., β-hydroxyalkylmercaptide or β-aminoalkylmercaptide; and finally oxidizing the thioether side chain to sulfoxide or sulfone.

Epihalohydrins used in the polymerization step include epichlorohydrin, epibromohydrin, and epiiodohydrin.

Examples of suitable alkylene oxides for use in copolymerization with epihalohydrin are the following: alkylene oxides, such as ethylene oxide, propylene oxide, 1,2-butylene oxide, 2,3-butylene oxide, isobutylene oxide and octylene oxide; glycidol; glycidyl ethers, such as, methyl glycidyl ether, allyl glycidyl ether, phenyl glycidyl ether, butylglycidyl ether, octylglycidyl thioether and p-dodecylphenyl glycidyl ether; and others such as tetrahydrofuran and trimethylene oxide.

In the copolymerization of epihalohydrin with one or more alkylene oxides, the addition of epihalohydrin and alkylene oxide during copolymerization may be alternated to yield polyethers having haloalkyl side chains in predetermined structural patterns. For example, if one mole of epichlorohydrin and one mole of ethylene oxide are added to 0.1 mole of ethyl alcohol as the active hydrogen initiator, the predominant product obtained would have the statistical formula:

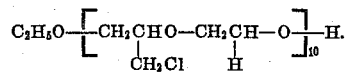

Alternatively, if two moles of epichlorohydrin is added to 0.1 mole of ethyl alcohol, followed by the addition of 5 moles of ethylene oxide, a species having the following statistical formula would be obtained:

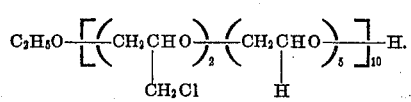

Generally speaking, the variation in spacing between the side chains containing halogen atoms along the polyether chain is unlimited, thus it is possible to control the number of the oxidized thioether side chains in the final product. In addition, the active hydrogen initiator may contain one or more halogens, such as ethylene chlorohydrin or glycerin dihalide, which halogens would represent reactive sites for the replacement reactions.

In carrying out polymerization or copolymerization to prepare polyethers containing halomethyl side chains as described above, cyclic ether monomer or mixtures of cyclic ether monomers, the active hydrogen initiator and a Friedel-Crafts catalyst are preferably charged into a closed vessel and heated until polymerization is complete. In the case where a copolymer is being formed, the monomers, a prepolymer or mixture thereof may be charged simultaneously or consecutively or alternatively one or the other in whatever mole ratios are needed to form the desired product. The proportion of catalyst may vary from 0.05 to 15 weight percent of the reacting materials, e.g., monomers, prepolymers, or mixtures thereof, with 0.2 to 5 weight percent being preferred. The reaction mass is advantageously agitated during polymerization which is generally carried out at temperatures within the range of 0° to 200°C, preferably from 20° to 100°C. Alternatively polymerization may be carried out with monomeric and/or polymeric reactants, catalyst and polymer product all dissolved or suspended in an organic diluent. In such instances, equal proportions of diluent are used, with suitable diluents including diethyl ether, dioxane, diisopropyl ether, petroleum ether, benzene and n-hexane. It is advantageous to choose a diluent which boils at about polymerization temperature, and to heat the mass to induce gentle reflux, thereby assisting in the close control of the reaction temperature. Other polymerization methods which are well known in the art may also be suitably employed. For example, high molecular weight polyethers can be prepared by contacting cyclic ether monomer with a Friedel-Crafts catalyst.

Examples of suitable active hydrogen initiators include water and organic active hydrogen initiators such as aliphatic monohydric alcohols, e.g., methanol, ethanol, 2-butanol and 1-octanol; alcohol ethers, such as, ethylene glycol monomethyl ether and ethylene glycol monoethyl ether; aliphatic polyhydric alcohols, e.g., ethylene glycol, propylene glycol, 1,3-butanediol, 1,4-butanediol, glycerol and sorbitol; hydroxyl terminated polyethers, e.g., polyethylene glycols, polypropylene glycols, polybutylene glycols and dihydroxypropyl ether of bisphenol A; haloalcohols, e.g., ethylene chlorohydrin and glycerol dichloride; monohydric phenols, e.g., phenol, xylenol and p-chlorophenol; dihydric mononuclear phenols, e.g., resorcinol and hydroquinone; polyhydric mononuclear phenols, e.g., phloroglucinol; dihydric dinuclear phenols, e.g., bisphenol A and bis-p-hydroxyphenyl methane; polyhydric polynuclear phenols, e.g., phenolic novolacs made by condensation of phenol with formaldehyde under acid conditions; sugars, e.g., sucrose, glucose, fructose, maltose and other mono-, di- and polysaccharides; and other active hydrogen compounds, e.g., thiols, amines and the like.

Examples of catalysts suitable for the polymerization reaction include the Friedel-Crafts catalysts such as the Lewis acids and organometallic products exhibiting the reactivity of Lewis acids, such as $BF_3$, $AlCl_3$, $SnCl_4$, $ZnCl_2$, $FeCl_2$, $FeCl_3$, $FeBr_2$, $FeBr_3$, $BeCl_2$, $BCl_3$, $SbCl_5$, $TiCl_4$, $CoCl_2$, $NiCl_2$, $BiCl_2$, $InCl_3$, $ZrCl_4$, titanium tetraalkyl esters, aluminum alkyls and aluminum alkoxides, diethyl zinc in combination with alumina, or oxygen, HF and complexes of HF with $PF_5$, protonic acids and acid salts such as sulfuric acid, phosphorous acid, phosphoric acid, sodium hydrogen sulfate and the like, and combinations thereof.

The crude polyether product resulting from the polymerization process, in addition to containing the desired epihalohydrin polymer, may contain unreacted monomer. The monomer can be removed by warming the crude product and subjecting it to reduced pressure.

The epihalohydrin polymer is readily converted to polyether having the described oxidized thioether side chains by one of several techniques.

In accordance with one technique the prepared epihalohydrin polymer is dissolved in a mercaptoalkanol having the formula

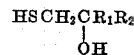

and a base in an inert organic diluent such as a lower alkyl alcohol such as methanol, ethanol, or isopropanol, dimethylformamide, glycols, glycol ethers, and N-methyl pyrrolidone, in which the metal halide salt which forms is poorly soluble. The reaction mixture is heated at 25° to 150°C, preferably 40° to 90°C. The time required depends on the charge. The bases that can be used are the alkali metals, alkali metal alcoholates, alkali metal hydroxides, alkali metal carbonates, quaternary ammonium compounds such as tetramethyl ammonium hydroxide, and tertiary amines such as pyridine, quinaldine, quinuclidine and triethyl amine. A more complete description of this reaction and related reactions is given in U.S. Pat. No. 3,415,902.

By a similar technique the intermediate polyether having β-hydroxythioether side chains is prepared by (1) reacting the mercaptoalkanol with alkali metal or alkaline earth metal hydroxide to form a metal β-hydroxymercaptide, e.g.,

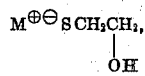

and (2) reacting the metal β-hydroxymercaptide with the epihalohydrin polymer, preferably in an inert diluent as described above, to form the intermediate polyether. The resulting polyether having β-hydroxythioether side chains dissolved in an organic diluent can be reacted with hydrogen chloride, preferably by bubbling gaseous hydrogen chloride into the polyether solution which also contains a water absorbing salt such as sodium sulfate, to form β-halothioether side chains. Such reaction is preferably carried out at temperatures ranging from −10° to about 120°C for periods from about one-half to about 24 hours. The amount of hydrogen chloride used is ordinarily at least that amount which is equal on an equivalent basis to the amount of hydroxy to be replaced, preferably in excess of that amount. The amount of hydroxy replaced is usually the amount necessary to yield a polyether in which at least 10 mole percent comprises

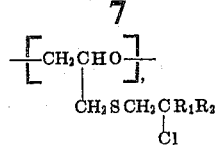

preferably from about 12 to about 100 weight percent. Alternatively, the hydroxyl of β-hydroxy thioether side chains can be replaced by bromo or iodo in a similar manner.

To form α,β-ethylenically unsaturated thioether side chains, it is desirable to dehydrohalogenate the β-halothioether side chains of the above described polyethers. Such dehydrohalogenation is carried out in a conventional manner, preferably by reacting the specified polyether with an inorganic base such as an alkaline earth hydroxide or carbonate, an organic base such as triethylamine or the like. Other methods of dehydrohalogenation are also contemplated. Furthermore, a polyether having α,β-ethylenically unsaturated thioether side chains may also be produced by dehydration of polyether having β-hydroxythioether side chains in a conventional manner.

Mercaptoalkanols which are employed in the above techniques are represented by the general formula:

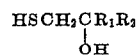

wherein $R_1$ and $R_2$ are as hereinbefore defined. Representative mercaptoalkanols include 2-mercaptoethanol, 2-mercapto-1-phenylethanol, 1-mercapto-2,3-propanediol, 1-mercapto-2-propanol, 1-mercapto-2-butanol, 1-mercapto-2-hexanol, 1-mercapto-3-propoxy-2-propanol, 1-mercapto-3-phenoxy-2-propanol, 1-mercapto-3-propylthiopropanol, 1-mercapto-3-ethoxy-2-propanol, 1-mercapto-2-phenyl-2-propanol, 1-mercapto-3-ethylthio-2-propanol, 1-mercapto-3-methoxy-2-propanol, 1-mercapto-3-octadecylthio-2-propanol, 1-mercapto-3-hexadecyloxy-2-propanol, 1-mercapto-3-methylthio-2-propanol and the like. Such mercaptoalkanols are known compounds having known methods of preparation.

Polyethers having β-aminothioether side chains and the ammonium derivatives thereof are readily prepared by reacting the epihalohydrin polymer with a mercaptoamine having the structural formula:

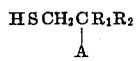

wherein A is amine and $R_1$ and $R_2$ are as described hereinbefore in the presence of strong base or with a β-aminomercaptide salt. The reaction is preferably carried out by dissolving the reactants and strong base in an inert diluent such as methanol and subsequently heating the reaction mixture to 25°–150°C. It is generally preferred to use an amount of aminomercaptan which exceeds the equivalent amount of halogen to be replaced. The β-aminothioether side chains are readily converted to ammonium form by conventional techniques.

In accordance with the above technique the polyethers having thioether side chains whether in the form of β-hydroxythioether, β-halothioether, α,β-ethylenically unsaturated thioether, β-aminothioether or mixtures thereof are oxidized to their respective sulfoxides, sulfones or mixtures thereof by treatment with a conventional oxidizing agent such as the inorganic or organic peroxides. Typical inorganic peroxides include hydrogen peroxide, alkali metal peroxides or alkaline earth metal peroxides. Typical organic peroxides include the peroxides of monobasic carboxylic acids, such as peracetic or perpropionic acid, perbenzoic acid or peroxides of polycarboxylic acids, such as monoperphthalic acid. Hydrogen peroxide is preferred because of its low cost, ready availability, the good results obtainable by its use and because its decomposition product (water) is not deleterious to the reaction. The oxidation of the thioether side chains to the sulfoxide or sulfone can be effected either with or without diluent. However, when the polyether and peroxide are both solids it is preferred to use as a reaction medium a diluent in which at least one and preferably both reactants are soluble. Examples of such diluents include liquid alcohols, ketones, aromatic hydrocarbons, aliphatic hydrocarbons and the like, with preferred diluents being the lower monohydric alcohols such as methanol, ethanol and isopropanol. The proportion of peroxide to polyether depends upon whether sulfoxide or sulfone side chains are desired. In the preparation of sulfoxide side chains the proportion of peroxide to polyether should be such that at least one atom of oxygen is available for each thioether side chain, with the preferred molar ratio of peroxide to thioether side chain being 1.0:1.0 to 1.1:1.0. In preparing sulfone side chains, the ratio of peroxide to thioether side chain is generally 2 to 1, with preferred ratios ranging from 2.0:1.0 to 2.5:1.0. If a mixture of sulfone and sulfoxide side chains are desired, a ratio of peroxide to thioether side chains between the aforementioned ratios is required. The reaction temperature can range from about 0° to about 90°C, with a temperature ranging from about 25° to about 75°C being preferred. The pressure at which the oxidation reaction takes place is not particularly critical, in that it can be run under atmospheric, subatmospheric or superatmospheric conditions.

Other techniques for the preparation of the polyethers of this invention may also be apparent to the skilled artisan. Such techniques are also contemplated as the particular mode of preparation is not critical. For example, a metal salt of a sulfoxide or sulfone represented by the formula $M^{+-}SOZ$ or $M^{+-}SO_2Z$ may be reacted with the epichlorohydrin polymer to form the polyether of the present invention.

Following the final reaction step, the reaction mixture containing polyether having oxidized thioether side chains is filtered to remove precipitated materials, and the polyether is recovered by vaporization or other convenient means for removal of diluent and other volatile impurities.

The polyethers of the present invention are liquids or solids depending on the molecular weight, comonomers used and degree of oxidation, generally the polyethers are colorless viscous liquids. The polyethers are generally soluble in many organic solvents including lower alkyl alcohols, ketones and chlorinated hydrocarbons.

The following examples are given to further illustrate the invention and should not be construed as limiting its scope. In the following specification and claims, all parts and percentages are by weight unless otherwise indicated.

EXAMPLE 1

A polyether having pendant β-hydroxythioether side chains is prepared by charging 0.25 equivalent each of propylene glycol-initiated polyepichlorohydrin having a molecular weight of 1,150, 2-mercaptoethanol and sodium hydroxide with 85 ml of isopropyl alcohol to a reaction flask. The mixture is stirred at 60°C for 2 hours. The reaction mixture is filtered and a tan liquid is recovered following evaporation of the isopropanol.

To a solution of 48.8 parts (0.33 equiv. of sulfur) of the polyether in 150 ml of benzene is added 37.7 parts of 30% hydrogen peroxide over a 15 minute period and the reaction temperature is maintained below 45°C over a two hour period at which time essentially no hydrogen peroxide remains. The remaining water is removed azeotropically via the benzene. After removal of the benzene a viscous, colorless liquid exhibiting sulfoxide adsorption at 9.6 microns remains. The polyether contains repeating units of the formula:

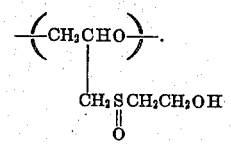

To form the corresponding sulfone, 75.7 parts of 30% hydrogen peroxide and 1 part of tungstic acid (ortho) are added over a 40 minute period to a solution of 48.8 parts (0.33 equiv. of sulfur) of the above-made polyether having β-hydroxythioether side chains. The reaction mixture is again maintained below 45°C. Following removal of water and benzene, the resulting polyether which is a gummy solid exhibits sulfone adsorption at 7.7 and 8.8 microns. The resulting polyether contains repeating units of the formula:

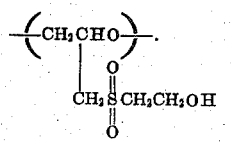

A 10-part portion of the sulfone just described is dissolved in 90 parts of water containing 0.5 equivalent of potassium hydroxide per equivalent of sulfone. The solution is applied to a cotton fabric to give a 2 percent weight gain after curing and is then cured for 5 minutes at 145°–155°C. The treated fabric is washed with a conventional clothing detergent and rinsed. The washed fabric exhibits a dry wrinkle recovery of 257° as determined by the AATCC approved Monsanto Wrinkle Recovery Angle Tester at 55 percent relative humidity and 75°F. A 10 percent aqueous solution of the sulfoxide of this example is applied to cotton fabric, cured and washed in a similar manner. The coated fabric exhibits an equivalent dry wrinkle recovery. Accordingly, good washability in addition to textile treating utilities are evidenced by polyethers having β-hydroxysulfone or β-hydroxysulfoxide side chains. Similar results are also observed for polyethers having a mixture of β-hydroxysulfone and β-hydroxysulfoxide side chains.

Five parts of a 75 percent aqueous solution of the above sulfoxide is mixed with 5 parts of a 75 percent solution of a methylated melamine resin in dioxane containing 2 percent p-toluenesulfonic acid as a catalyst. The mixture is applied as a film having an 0.0003 inch thickness to a steel panel and air dried for 2 hours at room temperature and baked at 150°C for 1 hour. The resulting non-brittle adherent film exhibits a hardness greater than a 9H pencil. When a methylated melamine resin containing no polyether having sulfone or sulfoxide side chains is applied to the steel panel and cured under similar conditions, a brittle film having a hardness of 9H but having poorer adhesive characteristics is formed.

EXAMPLE 2

A 162.4-part portion of polyether having β-hydroxythioether side chains, as prepared in Example 1, is dissolved in 250 parts methylene chloride containing 35 parts anhydrous Na$_2$SO$_4$. Hydrogen chloride is bubbled through the solution slowly for 20 hours at 25°–30°C. After removing precipitated Na$_2$SO$_4$ and other salts by filtration and methylene chloride by evaporation, a light brown oil having low hydroxyl absorption at 3.0 microns is formed. The resulting polyether product contains repeating units having the formula:

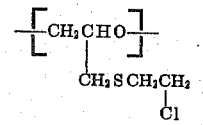

and contains 32 percent chlorine.

A 44.9-part portion (0.25 equiv.) of this polyether in 50 parts of methylene chloride is mixed with 30 parts of methylene chloride containing 0.05 part of tungstic acid (ortho). A 59.6-part portion (0.526 equiv.) of 30 percent hydrogen peroxide is added to the mixture. The reaction mixture is stirred overnight, heated to 70°C for 3 hours, diluted with 100 parts of methylene chloride, washed repeatedly with 50-ml portions of water and dried over sodium sulfate. Methylene chloride is removed and the resulting solid polyether exhibits a strong sulfone adsorption near 7.7 microns. The polyether has repeating units of the formula:

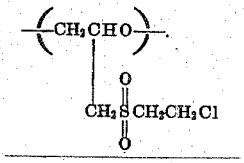

The corresponding polyether having sulfoxide side chains is prepared following the same procedure except that only one half the amount of hydrogen peroxide is used. The resulting viscous, light colored oil exhibits a sulfoxide peak at 9.5 microns. The polyether has repeating units of the formula:

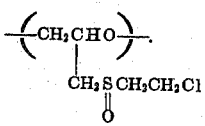

A 1-part portion of the polyether having β-chlorosulfone side chains is added to 120 parts of methylene chloride having dissolved therein 10 parts of cellulose triacetate. The resulting solution is applied as a thin layer to a glass plate using a 0.010 inch doctor blade.

The resulting film is tough and adheres well to the glass surface. A film containing cellulose triacetate and the polyether having β-chlorosulfoxide side chains exhibit similar strength and adhesion. By contrast, however, a film containing only the cellulose triacetate is easily torn and can be more easily removed from the glass by pulling.

EXAMPLE 3

A 21.16-part portion (0.1 equiv. of sulfone) of the sulfone prepared in Example 2 in 80 parts of dioxane is treated with 10.1 parts (0.1 equiv.) of triethyl amine and refluxed with stirring for 5½ hours. A white solid (Et$_3$N·HCl) is removed by filtration and the filtrate heated to evaporate volatile materials. The resulting product exhibited a sulfone peak at 7.8 microns and an unsaturation peak at 6.2 microns. The viscous polyether has repeating unit of the formula:

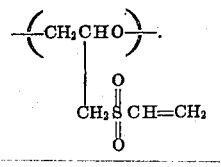

In a similar manner the sulfoxide of Example 2 is converted to a polyether having an α,β-ethylenically unsaturated sulfoxide side having repeating units of the formula:

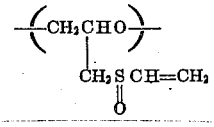

A solution of cellulose triacetate, the polyether having unsaturated sulfone side chain and methylene chloride is prepared and is applied to a glass plate as described in Example 2. The resulting film exhibits improved toughness and adhesion to the glass plate.

EXAMPLE 4

A solution of 40 g (1.0 mole) of NaOH in 50 ml of water is slowly added to a suspension of 84.8 g (0.5 mole) of N-(2-mercaptoethyl)diethylamine hydrochloride [H$_2$NCH$_2$CH$_2$SH·HCl] in 300 ml of isopropylalcohol. The resulting mixture is heated to 80°C and 46.5 g (0.5 equivalent of chlorine) of the polyepichlorohydrin of Example 1 dissolved is added to the mixture. The reaction mixture is heated at reflux for 6 hours and then filtered to remove salt precipitate. The filtrate is distilled at reduced pressure to remove water and isopropyl alcohol, and the residue product is redissolved in fresh isopropyl alcohol and refiltered. The isopropyl alcohol is removed and the remaining polyether having pendant β-aminothioether side chains retained. The polyether is then oxidized in accordance with the oxidation procedures of Example 1 and polyethers having repeating units represented by the formulas:

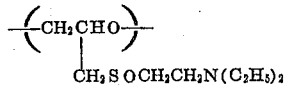

and

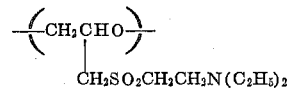

are recovered.

The resulting polyethers improve fabric wrinkle recovery as determined by the test method described in Example 1. The polyethers act as effective adhesion promoters for synthetic organic polymers.

Other examples according to Examples 1–3 are carried out employing different mercaptoalkanols, epihalohydrin polymers and oxidizing agents as described hereinbefore. The resulting polyethers having pendant oxidized thioether chains [—CH$_2$S(O)$_e$Z] impart improved adhesion and toughness to various polymers such as cellulose triacetate, cellulose acetate, and other synthetic organic polymers.

What is claimed is:

1. The polyether represented by the formula

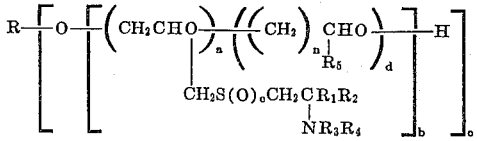

wherein R is hydrogen or the residue of an organic active hydrogen activator selected from the group consisting of monohydric alkyl alcohols, polyhydric alkyl alcohols, hydroxyl terminated polyalkylene polyethers and haloalkyl alcohols; R$_1$ and R$_2$ are individually hydrogen, alkyl, alkoxy, poly(alkyleneoxy)alkyl, poly(alkylenethio)alkyl or hydroxyalkyl; R$_3$ and R$_4$ are individually hydrogen, alkyl, hydroxyalkyl, alkoxyalkyl, or poly(alkyleneimino)-alkylamine, R$_5$ is hydrogen, alkyl, haloalkyl, mercaptoalkyl, alkoxyalkyl or alkylthioalkyl, a is a positive number and d is O or a positive number with the proviso that the ratio of a to d is such that the polyether contains at least 10 mole percent of

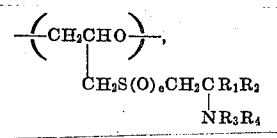

b is a positive integer; c is a positive integer from 1 to 8 and n is a positive integer from 1 to 4, e is 1 or 2; said polyether having a molecular weight in the range from about 300 up to 2 million.

2. The polyether of claim 1 wherein R$_1$ and R$_2$ are individually hydrogen or alkyl.

3. The polyether of claim 1 wherein R$_1$ and R$_2$ are individually hydrogen, alkyl or alkoxy.

4. The polyether of claim 3 wherein R$_5$ is hydrogen, alkyl or haloalkyl.

5. The polyether of claim 1 wherein R$_3$ and R$_4$ are individually hydrogen, alkyl or hydroxyalkyl.

6. The polyether of claim 1 wherein R is propylene glycol, R$_1$ and R$_2$ are hydrogen and R$_3$ and R$_4$ are ethyl.

* * * * *